Figure 1:
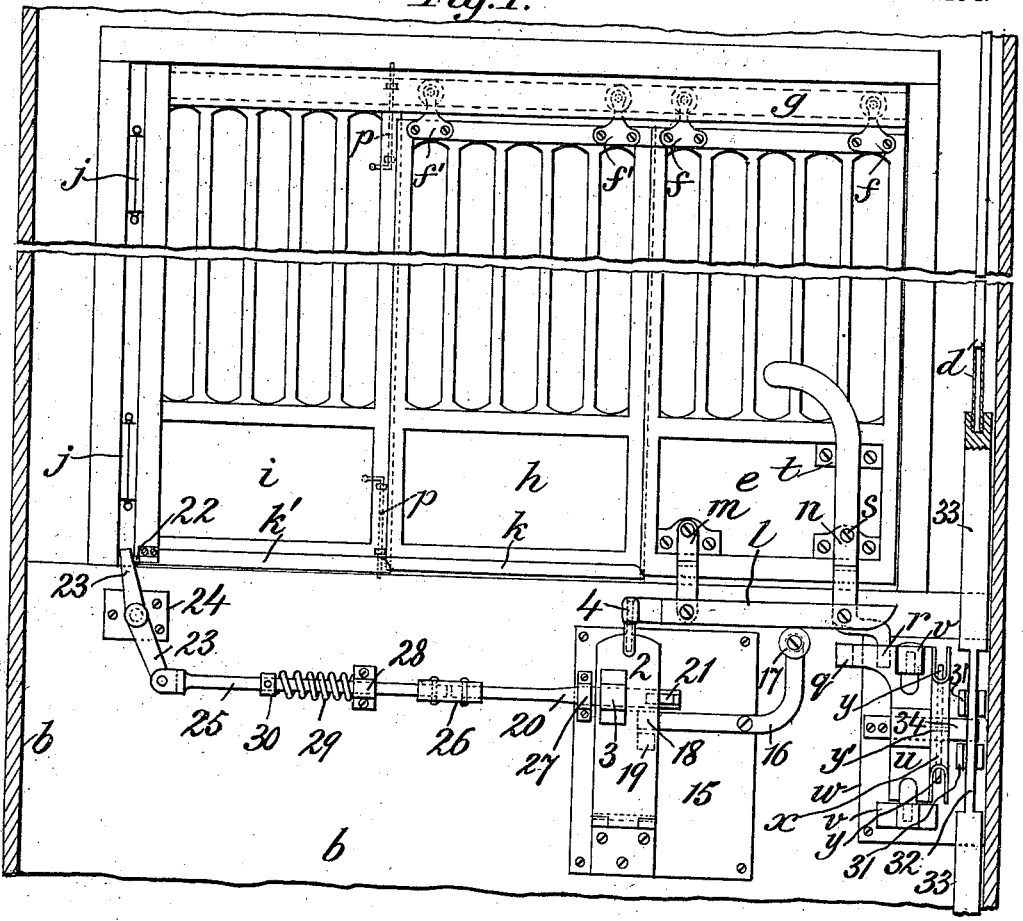

T. W. JENKINS.
SAFETY DEVICE FOR ELEVATORS.
APPLICATION FILED FEB. 6, 1905. RENEWED MAR. 4, 1907.

989,907.

Patented Apr. 18, 1911.

4 SHEETS—SHEET 1.

Witnesses
F. H. Schott
J. E. Birch

Inventor:
Thomas W. Jenkins
by Chas. J. Hedrick, Attorney

T. W. JENKINS.
SAFETY DEVICE FOR ELEVATORS.
APPLICATION FILED FEB. 6, 1905. RENEWED MAR. 4, 1907.
989,907.
Patented Apr. 18, 1911.
4 SHEETS—SHEET 2.
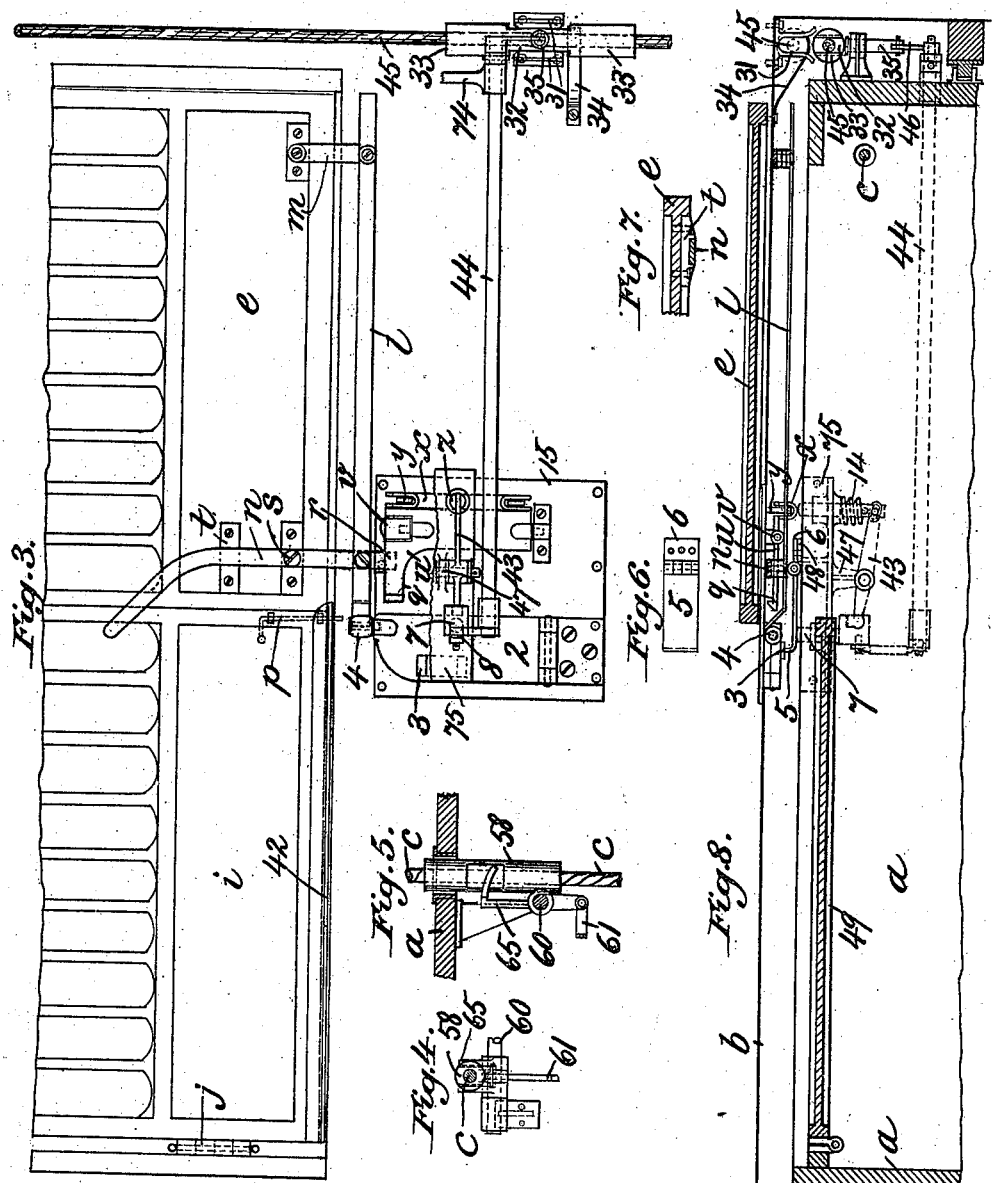
WITNESSES:
INVENTOR.
Thomas W. Jenkins
by
Chas. J. Hedrick
ATTORNEY.

T. W. JENKINS.
SAFETY DEVICE FOR ELEVATORS.
APPLICATION FILED FEB. 6, 1905. RENEWED MAR. 4, 1907.
989,907.
Patented Apr. 18, 1911.
4 SHEETS—SHEET 3.
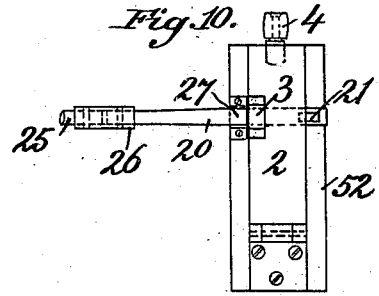
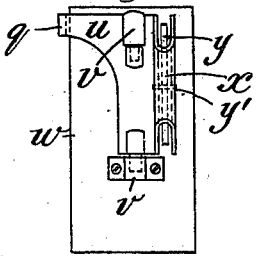
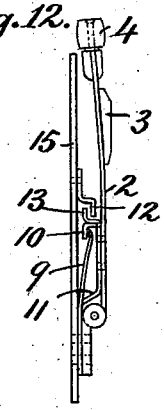
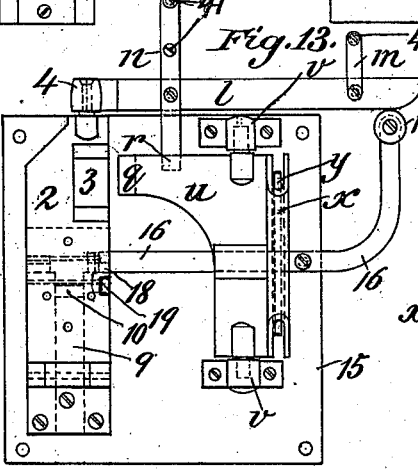
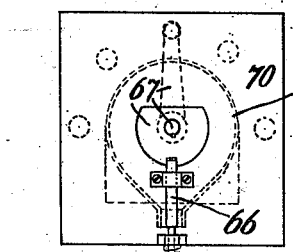
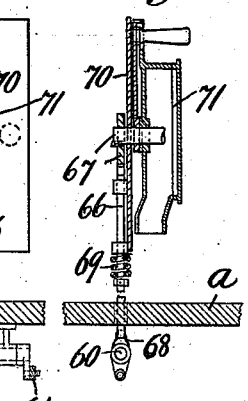
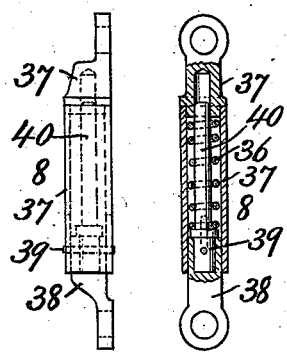
WITNESSES:
J. E. Burch
F. H. Schott
INVENTOR.
Thomas W. Jenkins
BY Chas. J. Hedrick
his ATTORNEY.

T. W. JENKINS.
SAFETY DEVICE FOR ELEVATORS.
APPLICATION FILED FEB. 6, 1905. RENEWED MAR. 4, 1907.
989,907.
Patented Apr. 18, 1911.
4 SHEETS—SHEET 4.
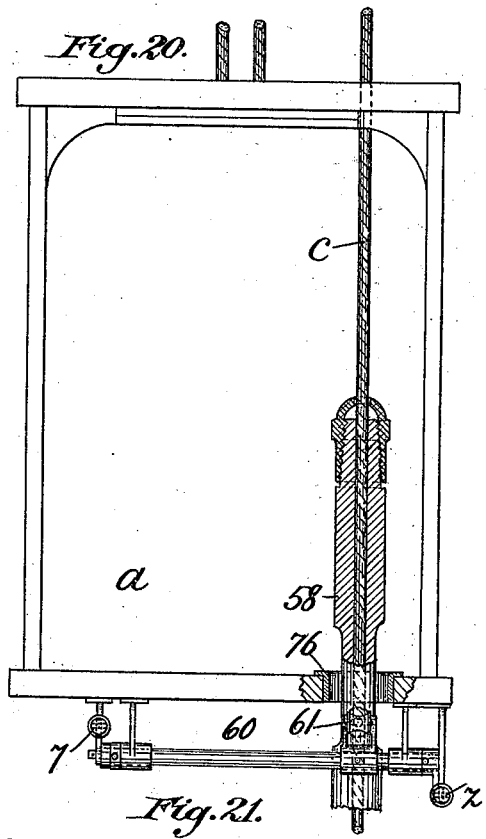
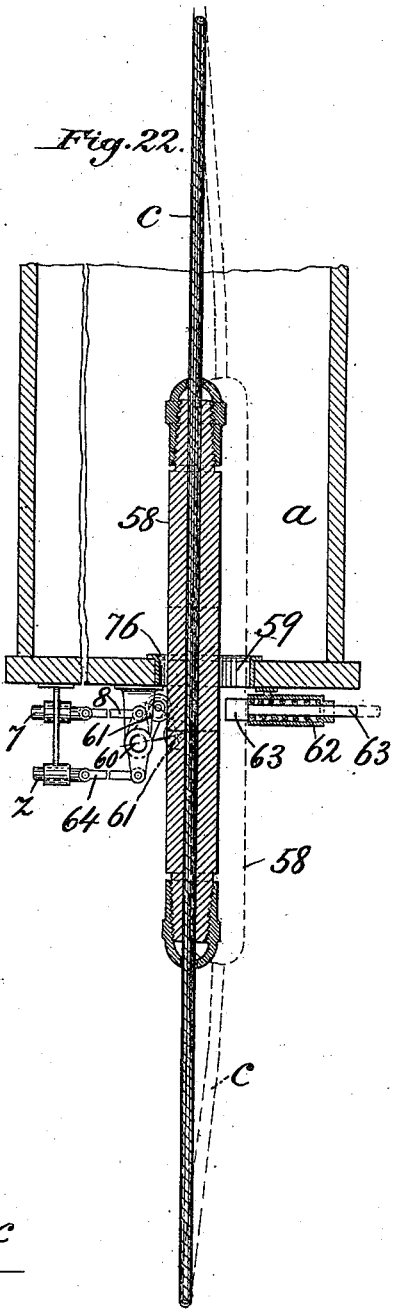
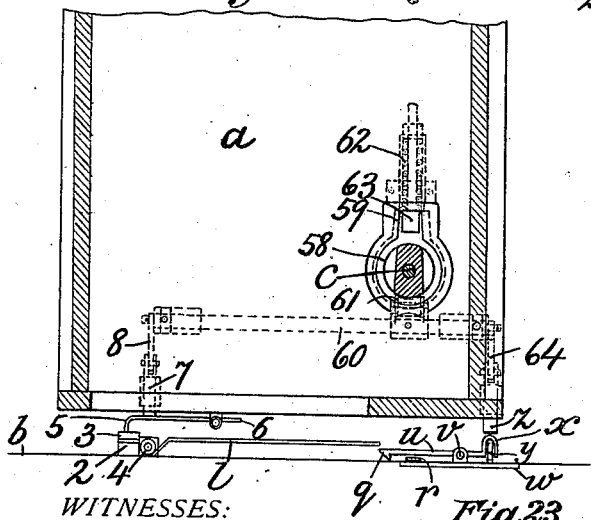
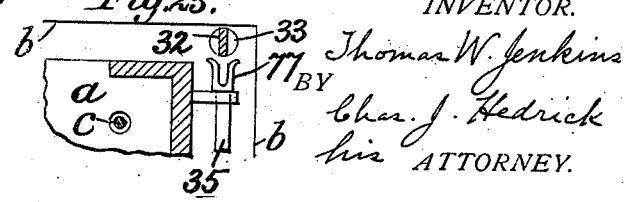

UNITED STATES PATENT OFFICE.

THOMAS W. JENKINS, OF PHILADELPHIA, PENNSYLVANIA.

SAFETY DEVICE FOR ELEVATORS.

989,907. Specification of Letters Patent. Patented Apr. 18, 1911.

Application filed February 6, 1905, Serial No. 244,473. Renewed March 4, 1907. Serial No. 360,497.

*To all whom it may concern:*

Be it known that I, THOMAS W. JENKINS, a citizen of the United States, residing at Philadelphia, in the county of Philadelphia and State of Pennsylvania, have invented new and useful Improvements in Safety Devices for Elevators, of which the following is a specification.

This invention relates to means for enabling transportation in elevators to be carried on with safety, and has reference more particularly to means for preventing access to the elevator shaft except at a landing at which a car is present. To effect this in the best mode the doors at the various landings are provided with latches for holding them closed, which latches are connected with controller-governed mechanism located at least in part on the car and consequently not operable to allow any door to be opened until the car is at the corresponding landing and the controller is in mid-position; and the controller by which the startings and stoppings of the car are effected is provided with a lock which is so connected with door-governed mechanism that the said controller can be shifted to start the car only when the door is closed at the landing at which the car is. In accordance with the present invention, new or improved door-latching and controller-locking means of this description are provided, which can best be described in connection with the accompanying drawings and which embody a number of features, believed to be new severally and collectively, as set forth in the hereinafter written claims. Ordinarily the doorways at the landings occupy each a part only (say, about a half) of one side of the elevator shaft, the remainder of such side being occupied by a stationary screen. In some elevators, however, this screen is itself movable, so that the whole of one side of the elevator shaft (or as near the whole as desired or as feasible) can be made open on occasion, while ordinarily it is only opened to the extent of the smaller doorway of the ordinary landing door.

Heretofore, so far as I am aware, when the elevator shaft has been provided with a movable screen, in addition to the customary landing door, to increase on occasion the width of the opening, there has been no provision, on the one hand, to prevent the removal of the screen, unless the car is then present at the landing, nor, on the other, to prevent the starting of the car from a landing at which the screen may have been removed.

In accordance with the present invention, provision is made for such cases and, in addition, the invention includes means whereby the removal of the screen, when the car is at a landing, is prevented unless and until the controller is brought to mid-position, which position it occupies when the car is at rest.

The screen and the door may each of them be movable in any desired way. Thus the screen may swing horizontally and the landing door slide horizontally (which is considered the best arrangement and is specially claimed); or both screen and door may slide horizontally; or one or other, or both of them, might move in other ways without exceeding the limits of the invention.

It is considered advantageous for the movable screen to carry the landing door; and this arrangement is made an element of some, although not of all my claims; since other arrangements could be used within the limits of the invention. It is also considered an advantage and special improvement to permit or to prevent the movements of both by one and the same latch or by a latching mechanism which is, at least in part, the same for both door and screen.

As said above, the movable screen used with the ordinary landing door is best arranged to swing horizontally; mechanism of new or improved construction applicable to use in such connection is believed to be new generally as applied to a swinging guard. Such guard might be the ordinary landing door, for example.

The following description, in connection with the accompanying drawings, explains what is considered the best mode of carrying the invention into effect; but it is to be understood that omissions, additions and modifications can be made indefinitely so long as the substance of any one or more of the hereinafter written claims is taken.

Figure 2:
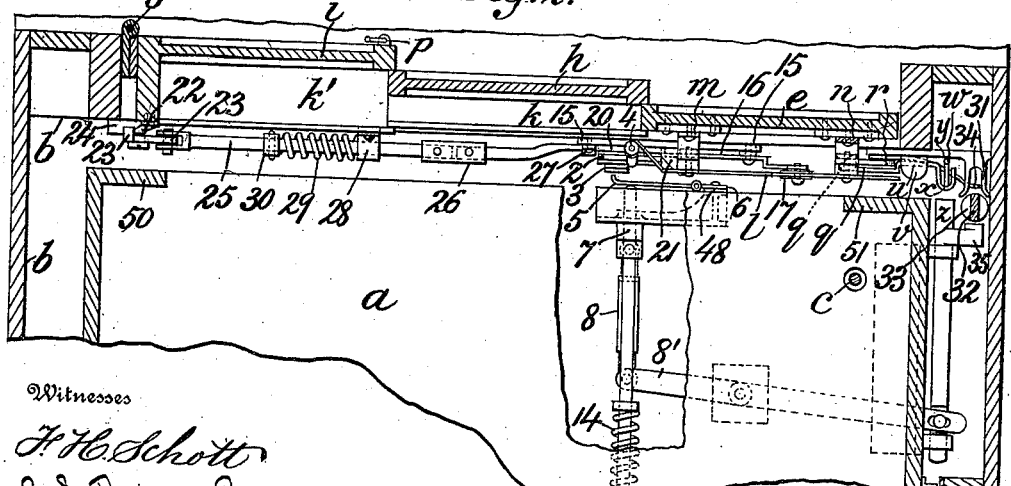

In said drawings, Figure 1 is an elevation of a landing door and movable screens with those parts of the door-latching and controller-locking means which are located on the wall of the elevator shaft looking outward from the middle of said shaft; Fig. 2 is a horizontal section of said landing door and screens and also of a portion of the elevator car, and shows the door-latching and controller-locking means on both sides of the gap or dividing line between said car and the wall of the elevator shaft; Fig. 3 is a view in elevation of another arrangement, also within the invention; Figs. 4 and 5 are detail views, in plan and side view, respectively, of another form of controller lock, also within the invention; Figs. 6 and 7 are detail views of the similarly lettered or similarly numbered parts in Figs. 1, 2 and 3; Fig. 8 is a view in horizontal section of the arrangement of Fig. 3; Fig. 9 is a view of an arrangement for enabling the controller to govern door-latching means, which arrangement can be employed within the limits of the invention; Figs. 10 and 11 are face views of the similarly lettered or similarly numbered parts of Fig. 1, detached; Figs. 12, 13, 14 and 15 are, respectively, profile, face, sectional and top views of the similarly lettered or similarly numbered parts of Figs. 1 and 3, with some changes; Figs. 16 and 17 are views of a form of controller-lock which can be used within the limits of the invention; Figs. 18 and 19 are views of the similarly numbered connecting rod of Fig. 2; Figs. 20, 21 and 22 are views of another form of controller-lock, within the invention; and Fig. 23 is a view of still another form of such lock, likewise within the invention.

The arrangement of Figs. 1 and 2 will first be described. In it the car $a$, which travels up and down in the elevator shaft $b$ in any ordinary or suitable way is provided with a controller in the form (as shown) of a rope $c$ to be pulled upon by the attendant in the known way. The rod $d$ (preferably tubular as shown in Fig. 1) moves with the controller $c$ so that by locking the said rod one locks the controller and prevents the attendant from starting the car. At each landing there is the ordinary landing door $e$, which, as shown, slides horizontally, being supported by hangers $f$ through the aid of rollers which travel on the outer of a pair of tracks $g$. The space (in Figs. 1 and 2) at the side of the door $e$ is closed in part by a screen $h$, which slides horizontally and in part by the screen $i$, which swings horizontally on hinges $j$. The tracks $g$ for the sliding door $e$ and movable screen $h$ are secured to the movable screen $i$. Near the bottom of the movable screen $h$ is a trough $k$ which forms a guide for the bottom of the ordinary landing door $e$; and near the bottom of the movable screen $i$ is a trough $k'$ which forms a guide for the bottom of the movable screen $h$ and as shown receives both the bottom of the movable screen $h$ and the trough $k$. When the ordinary landing door $e$ is unlatched, it can be moved aside to give entrance to and egress from the car, without disturbing either of the screens $h$ $i$. If a wider opening should be desired, the door $e$ and screen $h$ can both be moved alongside the screen $i$, thus giving an opening about twice the width of the ordinary doorway. If a still wider opening should be desired, the screen $i$ can be swung open on its hinges $j$, the cam rail $l$ and latch-engaging projection $r$ with their supporting arms $m$ and $n$ being raised above the floor level; and the door $e$ and screen $h$ will be carried with the screen $i$.

At $p$ are shown bolts for holding the screen $i$ in the closed position; they would, of course, be drawn to allow the screens and door to be swung open. The screens $h$ $i$ and door $e$ are all under the restraint of a latch $q$, which is pivotally mounted on the wall of the elevator shaft and which engages a projection $r$ depending from the door $e$. While this projection $r$ is under the restraint of latch $q$, the door $e$ and screen $h$ cannot be moved aside to allow entrance or egress; neither can the screens $h$ $i$ and door $e$ be swung open; because the projection $r$, extending below the floor level, would strike the wall of the elevator shaft.

The latch-engaging projection $r$ is made removable, being advantageously formed on or by the end of the arm $n$, which is pivoted at $s$ to the door $e$ and which is held at the end by a retaining device $t$. The arm is best made of spring metal, and arranged to spring into a notch between bevel faced ends (Fig. 7) of the retaining device.

With a view to its operation by a reciprocating piece on the car, the latch $q$ is best carried by a reciprocating piece $u$, which is mounted on vertical pivots between lugs $v$ on plate $w$ for attachment to the wall of the elevator shaft, and which is provided with an elongated tail portion $x$, beveled at the ends and provided with a holding spring $y$ (Fig. 14). The tail portion is best made U-shaped in cross section (Fig. 2), in order to receive a holding spring $y$ of wire. A pin $y'$ keeps the spring in place. The latch is withdrawn by pressure on the tail portion $x$ of a reciprocatory piece $z$ on the car acting across the gap. By having an elongated tail portion $x$, there will be a corresponding range within which the piece $z$ will be in position to press upon said tail portion. By having vertical pivots for the latch, the effect of a given movement of said piece $z$ will be uniform within said range. By beveling the ends of the tail portion $x$, the piece $z$ will merely turn the latch piece $u$, should it happen to be projected before the car is at (or within the predetermined distance of) the landing. To operate the reciprocatory piece $z$ use is made of a movement which is allowed to the door $e$ while it is under restraint of latch $q$, by providing a small space between the projection $r$ and the hook of the latch $q$ when the door $e$ is at the limit of its closing movement.

On the wall of the elevator shaft is mounted a motion bar 2 which carries a reciprocatory piece 3 to act across the gap and which is engaged by the before mentioned cam rail $l$. The motion bar is advantageously hinged to its support; and it is best arranged vertically with its hinge at the bottom and an anti-friction roller 4 at the top. The piece 3 is best in the form of a lump with bevel faced ends. The end of the rail $l$ is bent to form an inclined or cam surface which acts against the roller 4 and carries the motion bar 2 and reciprocatory piece 3 toward the car when door $e$ is moved in the direction of opening while it is under the restraint of latch $q$. This movement of piece 3 is communicated across the gap to a corresponding reciprocatory piece 5, which is best in the form of a vertically disposed plate hinged to a leaf 6 (Fig. 6) for attachment to the car. Behind the plate 5 is a pin 7, sliding in bearings and connected by link 8 with one arm of a rocker 8' (in the form of a lever) whose other arm is connected with the reciprocatory piece $z$ by which the latch $q$ is withdrawn from the path of projection $r$, in order to release the door $e$ from the restraint of the said latch. The door $e$ can then be fully opened; and the screen $h$ can also be moved aside. In order to swing open the screen $i$, the arm $n$ is released from the retaining device $t$ and swung to the right or the left, as may be preferred, thus raising cam rail $l$ above the floor level; so that it no longer interferes with the moving of screen $i$. The motion bar 2 is advantageously provided with a retracting spring; which is best in the form of a leaf spring 9 (Fig. 12) engaging a lip 10 on the motion bar; and it is also advantageous to provide the motion bar with a cover plate 11 for protecting the hinge against dirt. This cover plate has no spring action tending to hold or to retract the bar 2. It is located close to the hinge at an angle of more than thirty degrees with said bar. The lip 10 is best formed integral with said cover plate by bending the end of said plate. At 12 is shown a stop opposite a lip 13 (best formed integral with the cover plate) on the motion bar, to act as a guard against the motion bar moving so far out as to be caught by the car.

At 14 is a retracting spring for returning the reciprocatory pieces $z$ and 5 and intermediate parts, when the motion bar (with piece 3) is retracted by the spring 9. In the ordinary operation of the landing door $e$, this takes place when the said door is closed, as the bent end of the rail $l$ moves to the right under the roller 4. It would also take place whenever the motion bar should otherwise be released from the cam rail $l$, unless means should be taken to prevent. As shown, on the plate 15 (which also supports the motion bar and its accessory parts) is mounted a keeper 16 in the form of a lever which has a roller 17 at one end for engaging the rail $l$ and a head 18 at the other end for entering behind a lump 19 on the motion bar when said roller 17 is released by the rail. The pivot for the lever is so placed that gravity tends to turn the lever to the left. When, therefore, the door $e$ is moved aside, the rail $l$ moves to the left of the roller 17 and the head 18 enters behind the lump 19, so as to hold the motion bar in its outward position, independently of the rail $l$. The door $e$ and the screen $h$ can, therefore, both be moved to the left (which movement withdraws the rail $l$ from behind roller 4) without allowing the motion bar to be retracted. Also, as shown, there is a keeper 20 whose head 21 enters behind the motion bar and so holds it in the outward position, when the screen $i$ is swung open. When the screen $i$ is closed, an arm 22 attached thereto engages the upper end of a lever 23, which is pivoted on a plate 24 on the wall of the elevator shaft and whose lower end is connected by the rod 25 and coupling 26 with the keeper 20. This latter is shown as sliding in a loop 27 on the plate 15. The rod 25 slides in a loop 28 on the wall of the elevator shaft. A compression spring 29 interposed between the loop 28 and a collar 30 on the rod draws the rod 25 and keeper 20 to the left, when the pressure of the arm 22 is withdrawn from lever 23 by swinging open the screen $i$ on its hinges $j$. Either or both the keepers 16 and 20 can be used. Neither of them is essential to the operation of the latch $q$; for this has a beveled end (Figs. 8 and 15) and can be returned without detriment so soon as the projection $r$ has passed from its restraint; but even with respect to the operation of the latch the retention of the motion bar 2 in its outward position facilitates the return of the cam rail $l$ into position behind the roller 4; although this could, nevertheless, be effected without such retention. Its principal object is to maintain the lock on the controller, which is best effected (as will now be described) by the outward movement of the motion bar 2.

At each landing the rod $d$ (which moves with the controller rope $c$, as before mentioned) is provided with locking appliances which are best composed of a holding device in the form of a fork 31 on the wall of the elevator shaft and a block in the form of a neck 32 between heads 33 on the rod $d$. There is also a spring 34 tending to hold the block out of engagement with the holding device, or to disengage it when in engagement therewith. As shown, the spring and holding device are mounted on the plate $w$ which carries the latch $q$.

On the car $a$, the reciprocatory piece 35 is so located as to come opposite a set of locking appliances when the car is at a landing and the controller is in mid-position. When said piece 35 is advanced, it pushes the neck 32 into the fork 31, thereby engaging the block therewith and locking the controller. When it is retracted, the spring 34 insures the disengagement of the neck 32 from the fork, so that the controller c is free to be pulled upon to start the car. Ordinarily it is the practice to allow considerable idle motion to a rope controller in its mid-position; and, in view of this practice, the neck 32 is shown as somewhat longer than the fork 31; since less care is then required to bring the neck opposite the fork; but such extra length of neck need not be used.

As shown, the reciprocatory piece 35 is attached to the reciprocatory piece z, so that they are moved forward together by motion communicated from the cam rail l on door e, through the motion bar 2, reciprocatory pieces 3 and 5, pin 7, link 8, and rocker lever 8'. So long as the motion bar is held in its outward position, whether by the cam rail l or by either or both the keepers 16 and 20, the controller is kept locked by the engagement of the locking appliances 31 and 32 with each other. When the motion bar is released, the spring 14 withdraws the reciprocatory pieces z and 35 (through the link 8 and rocker 8'), whereupon the spring y places the latch q in the path of the projection r; and the spring 34 unlocks the controller by pushing the neck 32 out of the fork 31.

In order to prevent the door e from being opened unless and until the controller is in mid-position, the locking appliances are provided with stops which prevent a locking engagement at other times and which are best formed by extensions of the heads 33 in such manner that one or other of them is opposite the fork 31, except in mid-position of the controller c. In this position the neck 32 can, as before mentioned, be brought opposite the fork 31 ready to be pushed into engagement therewith by the advancement of piece 35.

While the car is ascending and descending, the screens h i and door e at each of the landings are normally closed; and the door e should be at the limit of its closing movement, because the spring 9 draws inward the motion bar 2 and roller 4. The latter, pressing against the bent end of the rail l, tends to force it and the door e to the right. Should accident or design, however, bring about such a condition that the motion bar 2 at any landing is in its outward position when the car a is passing, the reciprocatory piece 5 will be acted upon by one of the bevel faced ends of the piece 3; and the controller c, being at the time in its up or down position, and one of the stops 33 opposite the fork 31, the motion of the rocker 8' will be prevented by contact of the reciprocatory piece 35 with said stop 33. To avoid breakage under these conditions, provision is made for a yielding connection, which is best constituted by a spring 36 (Fig. 19) interposed between members 37 and 38 of the link 8 movable relatively to each other. As shown, the member 37 is in the form of a tube with an eye piece attached thereto at one end and incloses a spiral compression spring 36 between said eye piece and the corresponding eye piece of the other member 38 which slides in the tube. A cross pin 39 working in a slot limits the motion of one member relative to the other under the pressure of the spring, but permits a relative motion of them against said pressure. If, therefore, the reciprocatory piece 5 should be moved toward the middle of the car at a time when the motion of the rocker 8' is resisted by stop 33, the effect is temporarily to shorten the link 8 by compressing the spring 36. When the piece 5 is released, the spring 36 restores the link 8 to its normal length. A longitudinal pin 40 fast at one end in the eye piece of member 38 and fitting loosely in a hole in the other eye piece increases the transverse stiffness of the link.

With the arrangement of Figs. 1 and 2, the latch q restrains both screens h i and the landing door e for ordinary use. When they are closed and the projection r is behind the latch none of them can be opened. When the car is to stop at a landing, the controller c is brought into mid-position for the purpose, and this brings the neck 32 of rod d opposite the fork 31 at each landing. On moving the door e to the left, the bent (left hand) end of cam rail l pushes the roller 4 and motion bar 2 outward, so that the reciprocatory piece 3 acts across the gap against the corresponding piece 5 and through the pin 7 and link 8 rocks the lever 8' in the direction to advance the reciprocatory pieces z and 35 and thereby, on the one hand, to turn the piece u and withdraw the latch q and, on the other, to force the neck 32 into the fork 31 and lock the controller c. If only an ordinary door opening is desired, the screens h i are not disturbed; the keeper 16 will be released by the rail l traveling beyond the roller 17; but its operation is idle; because the rail l remains behind the roller 4. Should a greater width of opening be desired, the movable screen h and the door e are both moved opposite the screen i. When the rail l releases the roller 4, the motion bar 2 is retained in its outward position by the previous interposition of head 18 between the lump 19 on the motion bar and the plate 15, when the rail l released the roller 17. The controller, therefore, remains locked. If the fullest opening is desired, the arm n is released from the retaining device t and is thrown over so as to lift the cam rail *l* and latch-engaging projection *r* above the level of the floor. The friction in the joints between the rail *l* and the arms *m n* can be made sufficient to hold the rail in its raised position. The bolts *p* being drawn, the movable screen *i* can be swung open, carrying with it the screen *h* and door *e*. As the arm 22 releases the lever 23, the spring 29 pulls the keeper 20 to the left and interposes its head 21 between the motion bar 2 and the plate 15. This furnishes an additional means for keeping the controller locked.

When the screen *i* is swung to, the arm 22 turns the lever 23 to the left and removes the keeper head 21 from behind the motion bar 2. The bolts *p* are fastened and the rail *l* is swung to its position below the floor. The arm *n* will spring itself into the notch of retaining device *t*. As the screen *h* is slid to the right, the rail *l* enters behind the roller 4 and subsequently depresses the roller 17 so as to lift the keeper head 18 from behind the lump 19. As door *e* approaches the limit of its closing movement, the latch-engaging projection *r* passes to the right of the hook of latch *q* and at the same time the bent end of the cam rail *l* allows the roller 4 and motion bar 2 to be moved inward by the spring 9. There is nothing now to prevent the movement of the piece 5 away from the middle of the car *a*; and consequently the spring 14 rocks the lever 8' in the direction to withdraw the pieces *z* and 35 and thereby to allow the spring *y* to place the latch *q* in the path of the projection *r* and the spring 34 to push the neck 32 out of the fork 31, thus putting the screens *h i* and door *e* again under restraint of the latch *q* and unlocking the controller *c* so that it can be moved to start the car up or down, according to the direction in which it may be pulled.

If it should be thought unnecessary for the screen *i* to be movable, its permanency would not prevent the operation of the movable screen *h* and door *e* as above described. The rail *l* and projection *r* could in such a case be immovably secured, as indicated in Fig. 13, by the three screws 41 in the supporting arms *m n*, instead of being adapted to be lifted above the floor level, as described with reference to Figs. 1 and 2. On the other hand, the screen *i* could be made movable and the screen *h* be dispensed with. Such an arrangement is shown in Figs. 3 and 8; in which the laterally sliding door *e* is carried directly by the hinged screen *i*, having a trough 42 near its bottom to serve as guide for the bottom of the door *e*. In these figures neither of the keepers 16 and 20 is shown; but either or both could be employed after the manner shown in Figs. 1 and 2. The piece *u* could be recessed to receive the lever 16, as indicated in Figs. 13 and 14, in which, as in Figs. 3 and 8, the latch *q* is placed on the same plate 15 which carries the motion bar 2. This arrangement is convenient; but it brings the latch *q* opposite the doorway of the elevator; whereas, in Figs. 1 and 2 it is placed (more advantageously) in a position less accessible to the elevator attendant, namely, beyond the sides of the elevator doorway.

In Figs. 3 and 8 there are two rockers under the floor of the car, one, 43 (in the form of a lever), for transmitting motion from the motion bar 2 to the reciprocatory piece *z* to withdraw the latch *q* and the other, 44 (in the form of a rock-shaft), for transmitting motion from the motion bar 2 to the reciprocatory piece 35 to force the neck 32 of the block at the landing at which the car may be into the corresponding fork 31. A rope 45 is shown in place of the rod *d*. Like the latter, it moves in such manner as to bring the neck 32 at each landing opposite the fork 31 at each landing when the controller *c* is in mid-position, and a head 33 opposite said fork when the controller *c* is in either of its end positions. The reciprocatory piece 35 is connected by link 46 with a depending arm of the rock-shaft 44; and the pin 7 is connected by link 8 with an upright arm of the same rock-shaft. At 74 is one of the supporting brackets for shaft 44. The lever 43 which operates the reciprocatory piece *z* is journaled in a bracket 47 of the same casting 75 which carries the slide bearings for the pins 7 and *z*. This casting has a horizontal plate for attachment to the bottom of the car *a* and an upright plate 48 to which the leaf 6 of the reciprocatory piece 5 is secured. Such plates are also embodied in the corresponding casting of Fig. 2. The spring 14 for returning the reciprocatory pieces 5, *z* and 35 when the motion bar moves to its inward position is shown between a pin on the piece *z* and the bearing for the latter.

Usually the elevator car has a doorway opposite the ordinary landing door *e*, the rest of the elevator car front being closed by a screen. As shown in Fig. 8, this screen 49 is hinged so that it can be opened also when the screen *i* is swung back. In Fig. 2 the whole front of the elevator car between the side panels 50 and 51 is open constantly. If it should be desired to use the keeper 20 without the keeper 16, and to separate the latch from the motion bar, the supporting plate can be made narrow, as shown at 52 (Fig. 10). In Fig. 11 the latch-supporting plate *w* does not carry the fork for the controller lock. Although it is considered advantageous and a special improvement to operate the reciprocatory piece *z* from the door and to govern it by the controller interposing a stop when said controller is in mid-position, as shown in Figs. 1 and 2 and also in Figs. 3 and 8, said piece $z$ could otherwise be actuated and be otherwise governed. In Fig. 9 the wheel controller 53 is provided with a cam 54 which depresses the rod 55 when the controller is in mid-position and in so doing turns the rocker 56 under the floor of the car $a$ in the direction to advance the piece $z$. When the controller 53 is turned out of mid-position, the spring 57 withdraws the piece $z$ and raises the rod 55.

The controller-locking appliances at the landings may have only one part of each set so located, the other being carried by the car and being common to all the sets. The blocks might also be placed on the controller rope $c$ itself, instead of on a rod $d$ or rope 45 movable with the controller. Both modifications are shown in Figs. 21–22. There is for each landing a block 58 on the controller rope $c$ having a neck between heads and the engaging device 59 is carried by the car, so that the same device 59 acts in turn with each of the blocks 58. This device, as shown, consists of a fork opening at the side of a ring 76 through which latter the blocks 58 and controller rope $c$ pass.

The rocker 60 (in the form of a rock-shaft) under the car floor is provided on an upright arm with a roller 61 which presses the neck of block 58 into the fork 59 when said rocker is turned in the proper direction, provided the controller is in mid-position. When the roller 61 is released, the spring 62 operates the pusher 63 to insure the ejection of the block from the fork 59. The rock-shaft is shown as having an upright arm connected by the link 8 with the pin 7 behind the reciprocatory piece 5 to which motion is communicated across the gap from the piece 3 on the motion bar 2, the latter being operated by the cam rail $l$ pushing outward the roller 4 on said motion bar, as previously described. It is also shown as having a depending arm connected by a link 64 with the reciprocatory piece $z$, by which the latch $q$ is withdrawn from the path of the latch-engaging projection $r$, before described.

Instead of having the fork stationary and pushing the neck of the block into it (as described with reference to Figs. 1 and 2 and Figs. 3 and 8, as well as Figs. 20–22), the fork can be moved to engage the neck of the block. One such arrangement is shown in Fig. 23, in which the fork 77 is on the reciprocatory piece 35 and engages the blocks 32–33. The blocks in this arrangement would best move in the same direction as the controller rope $c$; so that, if creeping should occur, any movement of the block will tend to stop the car; but it is not essential that they should so move. In the arrangements of Figs. 1 and 2 and Figs. 3 and 8, since neither part of the locking appliances moves with the car, it is considered merely a matter of convenience whether the blocks do or do not move in the same direction as the controller rope. The blocks (when not placed on the controller rope $c$) may or may not move at the same rate as said rope $c$, whether locking appliances at the landings are engaged by devices also at the landings or by a device on the car.

In Figs. 4 and 5 the fork 55 is mounted under the car floor on the rock-shaft 60, operable as described with reference to the similarly numbered shaft of Figs. 20–22. Such shaft 60 could also be utilized (Figs. 16 and 17) to raise the rod 66 so as to lock a controller on the car by engaging the end of said rod in a notch on the controller 67. As shown, the lower end of the rod rests on a cam 68 on the rock-shaft and is raised thereby when the rock-shaft is in the position shown. A spring 69 is shown to hold the rod down on the cam so that it withdraws itself from the notch in the controller when the cam is turned; but the weight of the rod might answer the purpose. When the controller is not in mid-position, it forms a stop to resist the motion of the rod 66 and consequently also of the rocker 60. The controller shown consists of the movable part of an electric switch for an electrically operated elevator. Other parts of such a switch are shown at 70 and 71.

In the hereinafter written claims the words "at the landing" are used in contradistinction to "on the car." Devices "at the landing" may be located "inside the car space" (as exemplified by the block 58 in Figs. 4–5 and 20–22) or they may be located "outside the car space" (as exemplified by the block 32–33 in Figs. 1–2, 3, 8, and 23 and by the fork 31 in Figs. 2 and 8). They do not, in either case, have the same participation in the car's motion which is possessed by devices "on the car" (exemplified by forks 59, 65, 77, in Figs. 21–22, 4–5 and 23, respectively, and by the rod 66 and notched disk in Figs. 16–17).

The present application is in part a continuation of my application of February 4, 1904, No. 191,931, that is to say, it is a continuation thereof in so far as any claim hereof may include matter described therein or substantially suggested thereby. In said application, alternative constructions are given; but all of them could not be separately claimed therein, in view of the holdings of the Patent Office which do not allow separate claims in the same patent to alternative constructions.

I claim as my invention or discovery:

1. The combination with an elevator car, a controller, a landing door, and a movable screen coöperating with said door, of latching appliances for restraining said door and said screen, locking appliances for restraining the controller which include a device at the landing movable with said controller and an engaging device, governing mechanism for causing said devices to be engaged when the door and screen are both open as well as when the door is alone open, and governing mechanism for causing the latch to be engaged unless the car is opposite said door with the controller in mid-position, substantially as described.

2. The combination with an elevator car, a controller, a landing door, and a movable screen coöperating with said door, of latching appliances for restraining said door and said screen, locking appliances for restraining the controller, governing mechanism which includes a cam rail for locking and unlocking the controller, and a keeper for maintaining the locked condition of the controller when the said rail is out of action, and governing mechanism for said latching appliances, substantially as described.

3. The combination with an elevator car, a landing door, and latching appliances for restraining said door, of governing mechanism which includes reciprocatory pieces and connecting devices as follows, namely: a reciprocatory piece on the car which communicates motion across the gap to release the door from restraint of said appliances, a reciprocatory piece on the car which receives motion from across the gap transversely to the line thereof, and connecting devices which transmit motion from the latter to the former reciprocatory piece, substantially as described.

4. The combination with an elevator car, a landing door, and latching appliances for restraining said door, of governing mechanism which includes a motion bar at the landing movable transversely to the line of gap and also reciprocatory pieces and connecting devices as follows, namely: a reciprocatory piece on the car which communicates motion across the gap to release the door from restraint of said appliances, a reciprocatory piece on the car which receives motion from said motion bar across the gap transversely to the line thereof, and connecting devices which transmit motion from the latter to the former reciprocatory piece, substantially as described.

5. The combination with an elevator car, a landing door, and latching appliances for restraining said door, of governing mechanism which includes reciprocatory pieces located on said car on the same side thereof and, respectively, receiving and communicating motion across the gap transversely to the line thereof, and also a rocker on said car connected with said pieces on opposite sides of its axis of rocking to transmit motion from one to the other of them, substantially as described.

6. The combination with an elevator car, a landing door, and latching appliances for restraining said door, of governing mechanism which includes a motion bar at the landing movable transversely to the line of gap and interconnected reciprocatory pieces as follows on the car, namely: a reciprocatory piece opposite said motion bar to receive motion therefrom across the gap, a reciprocatory piece on the same side of the car opposite said latching appliances to communicate motion to them across the gap in order to release the door from their restraint, and a rocker which is connected with them, respectively, on opposite sides of its axis of rocking and transmits motion from one to the other of them, substantially as described.

7. The combination with an elevator car, a landing door, and latching appliances for restraining said door, of governing mechanism which includes a cam-actuated motion bar at the landing and a reciprocatory piece on the car receiving motion across the gap from said motion bar, and also devices receiving motion from said reciprocatory piece for releasing the door from the restraint of said appliances, substantially as described.

8. The combination with an elevator car, a landing door, and latching appliances for restraining said door, of governing mechanism which includes a motion bar at the landing movable transversely to the line of gap and a reciprocatory piece on the car receiving motion across the gap from said motion bar, and also devices receiving motion from said reciprocatory piece for releasing the door from the restraint of said appliances, substantially as described.

9. The combination with an elevator car, a landing door, and latching appliances for restraining said door, of governing mechanism which includes a traveling cam rail at the landing, and a reciprocatory piece on the car receiving motion across the gap from said cam rail, and also devices receiving motion from said reciprocating piece for releasing the door from the restraint of said appliances, substantially as described.

10. The combination with an elevator car, a landing door, and latching appliances for restraining said door, of governing mechanism which includes the three following devices, namely: a traveling cam rail at the landing, a motion bar at the landing operated by said rail, and a reciprocatory piece on the car receiving motion across the gap from said cam rail through said motion bar, substantially as described.

11. The combination with an elevator car, a landing door, and latching appliances for restraining said door, of governing mechanism which includes the following devices, namely: a traveling cam rail at the landing, a reciprocatory piece on the car receiving motion across the gap from said cam rail, a reciprocatory piece on the car communicating motion across the gap to release the door from restraint of said latching appliances, and means on the car whereby the latter piece is operated to effect such release when the former piece is moved, substantially as described.

12. The combination with an elevator car, a landing door, and latching appliances for restraining said door, of governing mechanism which includes the following devices, namely: a traveling cam rail at the landing, a motion bar at the landing operated by said rail, a reciprocatory piece on the car receiving motion across the gap from said cam rail through said motion bar, a reciprocatory piece on the car communicating motion across the gap to release the door from restraint of said latching appliances, and means on the car whereby the latter piece is operated to effect such release when the former piece is moved, substantially as described.

13. The combination with an elevator car, a landing door, and latching appliances for restraining said door, of governing mechanism which includes the following devices, namely: a hinged motion bar at the landing and a reciprocatory piece on the car receiving motion across the gap from said motion bar and also devices receiving motion from said reciprocatory piece for releasing the door from the restraint of said appliances, substantially as described.

14. The combination with an elevator car, and a landing door, of latching appliances for restraining said door which include a latch-carrying reciprocatory piece at the landing mounted on a vertical axis and having a vertically elongated tail portion, substantially as described.

15. The combination with an elevator car, and a landing door, of latching appliances for restraining said door which include a latch-carrying reciprocatory piece at the landing mounted on a vertical axis and having a vertically elongated tail portion beveled at top and bottom, substantially as described.

16. Latching appliances for restraining an elevator door, which include a plate provided with lugs, a latch-carrying reciprocatory piece pivoted between said lugs and provided with a tail portion of U-shaped cross section, and a spring set in the trough of said tail portion and bearing at the ends against said plate, substantially as described.

17. The combination with an elevator car, a landing door, and a latch-withdrawing reciprocatory piece on said car, of latching appliances for restraining said door which include a latch-carrying reciprocatory piece at the landing mounted on a vertical axis and having a vertically elongated tail portion, substantially as described.

18. The combination with an elevator car, a landing door, and a latch-withdrawing reciprocatory piece on said car, of latching appliances for restraining said door which include a latch-carrying reciprocatory piece at the landing mounted on a vertical axis and having a vertically elongated tail portion beveled at top and bottom, substantially as described.

19. The combination with an elevator car, a controller, a landing door, and locking appliances for restraining said controller which include a device at the landing movable with said controller and also an engaging device, of governing mechanism for causing said devices to be engaged when the door is open which includes a reciprocatory piece on the car receiving motion from across the gap, substantially as described.

20. The combination with an elevator car, a controller, a landing door, and locking appliances for restraining said controller which include a device at the landing outside the car space movable with said controller and also an engaging device, of governing mechanism for causing said devices to be engaged when the door is open which includes a reciprocatory piece on the car receiving motion from across the gap, substantially as described.

21. The combination with an elevator car, a controller, a landing door, and locking appliances for restraining said controller which include a device at the landing outside the car space movable with said controller and also an engaging device at the landing, of a governing mechanism for causing said devices to be engaged when the door is open which includes interconnected reciprocatory pieces on the car, respectively, receiving and communicating motion across the gap, substantially as described.

22. The combination with an elevator car, and a controller, of a locking device movable with the controller, an engaging device, and a reciprocatory piece on said car, the first mentioned device being laterally movable to bring it into engagement with the second mentioned device, and the reciprocatory piece on the car being arranged to effect such engagement, substantially as described.

23. The combination with an elevator car, a controller, and a landing door, of a support which is long and slender like a rod or rope and is movable with the controller, a locking device at the landing mounted on said support, an engaging device, and governing mechanism for causing the engagement of said devices when the door is open, which mechanism includes a reciprocatory piece on the car receiving motion from across the gap, substantially as described.

24. The combination with an elevator car, a controller, and a landing door, of a support which is long and slender like a rod or rope and is located outside the car space and is movable with the controller, a locking device at the landing mounted on said support, an engaging device, and governing mechanism for causing the engagement of said devices when the door is open, which mechanism includes a reciprocatory piece on the car receiving motion from across the gap, substantially as described.

25. The combination with an elevator car, a controller, and a landing door, of a support which is long and slender like a rod or rope and is located outside of the car space and is movable with the controller, a locking device at the landing mounted on said support, an engaging device, and governing mechanism for causing the engagement of said devices when the door is open, which mechanism includes interconnected reciprocatory pieces on the car, one of them receiving motion from across the gap while the other of them in its turn transmits the motion back again across the gap, substantially as described.

26. The combination with an elevator car, a controller, and a door, of a door governed lock which includes a controller locking device on the door side of the gap, and interconnected reciprocatory pieces, both of them on the opposite side of the gap from the door and one of them receiving motion from across the gap while the other of them in its turn transmits the motion back again across the gap, substantially as described.

27. The combination with an elevator car, a controller, and a door, of a door governed lock which includes a controller locking device, and a motion bar, both of them on the door side of the gap, and interconnected reciprocatory pieces, both of them on the opposite side of the gap from the door and one of them receiving motion from across the gap while the other of them in its turn transmits the motion back again across the gap, substantially as described.

28. The combination with an elevator car, a controller, and a door, of a door governed lock which includes a controller locking device, and a cam, both of them on the door side of the gap, and interconnected reciprocatory pieces, both of them on the opposite side of the gap from the door and one of them receiving motion from across the gap while the other of them in its turn transmits the motion back again across the gap, substantially as described.

29. The combination with an elevator car, a controller, and a door, of a door governed lock which includes a controller locking device, a cam, and a motion bar, all of them on the door side of the gap, and interconnected reciprocatory pieces, both of them on the opposite side of the gap from the door and one of them receiving motion from across the gap while the other of them in its turn transmits the motion back again across the gap, substantially as described.

30. The combination with a cam, and a hinged motion bar actuated outwardly by said cam and provided with a lip, of a support for said bar, and a leaf spring arranged between said bar and the latter's support and held by the end next the hinge of said bar, the free end of said spring engaging said lip and tending to draw the latter toward the support for said bar, substantially as described.

31. In combination with a cam, and a support, an upright motion bar hinged at its lower end to said support and acted upon at its upper end by said cam and provided with a cover plate above the hinge between said bar and said support for protecting the hinge from dirt, the cam being located on the support side of said bar, substantially as described.

32. In combination with a cam, and a support provided with a stop set out from the support, a motion bar hinged to said support and acted upon by said cam and provided with a lip set out from said bar and interposed between said stop and said support, said cam being located on the support side of said bar, substantially as described.

33. A bar provided with a hinge at one end and with a bevel ended lump between the hinge axis and the other end of the bar, in combination with a reciprocatory piece movable over and beyond said lump at each end of the same, and a cam acting on said bar, the whole arranged for said lump to shift said reciprocatory piece in one position of said cam when said piece travels over said lump and to allow it to pass without such shifting in another position of said cam, substantially as described.

34. The combination with an elevator car, an elevator door, and a cam rail movable with said door and arranged for imparting motion transverse to the door's motion, of a motion bar hinged on the door side of the gap and movable by said cam transversely to the motion of the door, and a reciprocatory piece on said car receiving motion across the gap from said bar, substantially as described.

35. The combination with the controller of an elevator, an elevator car, and locking appliances for restraining said controller, of governing mechanism which includes means for communicating motion across the gap transversely to the line thereof to effectuate the locking of said controller, and a keeper which is movable in a plane parallel with said line and is arranged to hold said means in their locked position and to release them for unlocking according to the position of said keeper, substantially as described.

36. The combination with the controller of an elevator, and locking appliances for restraining said controller, of governing mechanism which includes a positively operated hinged motion bar and also a keeper movable in a plane transverse to the plane of movement of said bar and arranged to hold said bar in locking position and to release it for unlocking according to the position of said keeper, substantially as described.

37. The combination with the controller of an elevator, and locking appliances for restraining said controller, of governing mechanism which includes a cam rail and devices actuated positively by said rail and also a keeper for holding said devices in the position in which they are so placed by said rail when the latter is not in position to do so, substantially as described.

38. The combination with the controller of an elevator, and locking appliances for restraining said controller, of governing mechanism which includes each of the three following features, namely: a cam rail, a motion bar actuated thereby in the direction to effectuate the locking of said controller, and a keeper arranged to hold said motion bar in its locking position and to release the same for unlocking according to the position of said keeper, substantially as described.

39. The combination with the controller of an elevator, an elevator door, a movable screen coöperating with said door, and locking appliances which restrain said controller, of governing mechanism which includes each of the three following features, namely: a cam rail, a motion bar actuated thereby, and a keeper for holding said bar in its outward position when both door and screen are open, substantially as described.

40. The combination with the controller of an elevator, an elevator door, a hinged screen coöperating with said door, and locking appliances which restrain said controller, of governing mechanism which includes a keeper arranged to be brought into action by the swinging of said screen on its hinges, substantially as described.

41. The combination with the controller of an elevator, an elevator door, a movable screen carrying said door, and locking appliances which restrain said controller, of governing mechanism which includes each of the three following features, namely: a cam rail on said door, a motion bar actuated by said rail, and a keeper for holding said bar in its outward position, substantially as described.

42. The combination with the controller of an elevator, an elevator door, a hinged screen carrying said door, and locking appliances for restraining said controller, of governing mechanism which includes each of the three following features, namely: a cam rail on said door, a motion bar actuated by said rail, and a keeper for said bar arranged to be brought in action by the swinging of said screen on its hinges, substantially as described.

43. The combination with an elevator car, a controller, a landing door, and a coöperating screen movable in a different direction from said door, of latching appliances for restraining said door and said screen, locking appliances for restraining the controller, governing mechanism for causing the controller to be locked when the door and screen are both open as well as when the door is alone open, and governing mechanism for causing the door and screen to be latched unless the car is opposite said door with the controller in mid-position, substantially as described.

44. The combination with an elevator car, a controller, a landing door, and a coöperating screen movable in a different direction from said door, of latching appliances for restraining said door and said screen, locking appliances for restraining the controller, governing mechanism for causing the controller to be locked when the door and screen are both open as well as when the door is alone open, and governing mechanism for causing the door and screen to be latched unless the car is opposite said door, substantially as described.

45. The combination with an elevator car, a landing door, and a coöperating screen movable in a different direction from said door, of latching appliances for restraining said door and said screen, and governing mechanism for causing the door and screen to be latched unless the car is opposite said door, substantially as described.

46. The combination with an elevator car, a landing door, and a hinged screen carrying said door, of latching appliances for restraining said door and said screen, and governing mechanism for causing the door and screen to be latched unless the car is opposite said door, substantially as described.

47. The combination with an elevator door, and a hinged screen carrying said door, of an elevator car, a latch for restraining said door operable from across the gap to release the same, and a latch-engaging projection normally lying beyond the doorway when the screen is closed and movable to allow the screen to be swung open, substantially as described.

48. The combination with an elevator door, and a hinged screen carrying said door, of a cam rail located below the floor level and provided with supporting arms hinged to said door, so that by turning said arms the rail can be swung above the floor level to allow the screen to be swung open, substantially as described.

49. The combination with an elevator door, and a hinged screen carrying said door, of a cam rail located below the floor level and provided with supporting arms hinged to said door, so that by turning said arms the rail can be swung above the floor level to allow the screen to be swung open, and a keeper for holding in place the devices actuated by said rail, substantially as described.

50. The combination with an elevator car, and a swinging guard at an elevator landing, of a controller, locking appliances for restraining said controller, a keeper, and governing mechanism which includes a motion bar on the guard side of the gap and devices on the car and also means whereby the swinging open of said guard interposes the keeper between said bar and its support and so causes the controller to be locked, substantially as described.

51. The combination with a swinging guard, and a support for a motion bar, of a motion bar movable away from its support, and a keeper which interposes itself between said bar and its support and so causes said bar to be in its outward position when said guard is swung open, substantially as described.

52. The combination with a swinging guard, and latching appliances for restraining said guard, of an elevator car, a motion bar on the guard side of the gap, governing mechanism on the car operable by motion received from said bar across the gap, and a keeper which causes said bar to be in its outward position when said guard is swung open, substantially as described.

53. The combination with a swinging guard, a controller, and locking appliances for restraining said controller, of an elevator car, a motion bar on the guard side of the gap, governing mechanism on the car operable by motion received from said bar across the gap, and a keeper which causes said bar to be in its outward position when said guard is swung open, substantially as described.

54. The combination with a swinging guard, and latching appliances for restraining said guard, of an elevator car, governing mechanism which includes reciprocatory pieces on opposite sides of the gap, and means whereby said mechanism is caused to be in the position for releasing said guard when the same is swung open, substantially as described.

55. The combination with a swinging guard, latching appliances for restraining said guard, a controller, and locking appliances for said controller, of an elevator car, governing mechanism which includes reciprocatory pieces on opposite sides of the gap as well as devices for preventing the release of said guard unless the car is opposite the landing door with the controller in mid-position and which also includes means whereby the controller is caused to be locked when said guard is swung open, substantially as described.

56. The combination with an elevator car, a controller, and a landing door, of governing mechanism which includes a cam rail for locking and unlocking the controller, and a keeper for maintaining the locked condition of the controller when the said rail is out of action, substantially as described.

In testimony whereof I affix my signature, in presence of two subscribing witnesses.

THOMAS W. JENKINS.

Witnesses:
 JAMES GARDNER SANDERSON,
 CHAS. E. DANIELS.

---

Copies of this patent may be obtained for five cents each, by addressing the "Commissioner of Patents, Washington, D. C."